United States Patent [19]

Hermelin

[11] Patent Number: 5,061,520
[45] Date of Patent: Oct. 29, 1991

[54] PARTICLE ENROBING PROCESS AND APPARATUS

[75] Inventor: Victor M. Hermelin, Chesterfield, Mo.

[73] Assignee: KV Pharmaceutical Company, St. Louis, Mo.

[21] Appl. No.: 593,099

[22] Filed: Oct. 5, 1990

[51] Int. Cl.$^5$ .............................................. B05D 7/00
[52] U.S. Cl. .................................. 427/212; 427/240; 118/28; 118/29; 118/30; 118/52; 118/429
[58] Field of Search ....................... 118/28, 29, 30, 52, 118/429; 427/212, 215, 222, 240

[56] References Cited

U.S. PATENT DOCUMENTS

| | | | |
|---|---|---|---|
| 2,955,956 | 10/1960 | Baugh et al. | 427/215 |
| 4,298,476 | 11/1981 | Dudley | 210/373 |
| 4,318,941 | 3/1982 | Gillett et al. | 427/212 |

Primary Examiner—Shrive Beck
Assistant Examiner—Terry J. Owens
Attorney, Agent, or Firm—Polster, Polster and Lucchesi

[57] ABSTRACT

Particles are enrobed or coated by introducing, to a spinning cup having an outwardly upwardly extending inner surface with an upper edge, a liquid coating material and particles of greater density than the coating material. The coating material and particles are introduced inboard of the peripheral surface, perferably in separate streams. The speed of rotation of the spinning cup is controlled to cause the coating material to climb up the surface but to stop short of the upper edge, and at the same time to cause the particles to travel through the coating material, be enrobed with the coating liquid, climb out of the liquid coating material, and be ejected over the upper edge. The spinning cup is symmetrical about a central vertical axis. It has a peripheral surface sloping outwardly upwardly, which surface can be stepped outwardly upwardly, and a control device is provided for controlling the speed of rotation of the spinning cup.

14 Claims, 1 Drawing Sheet

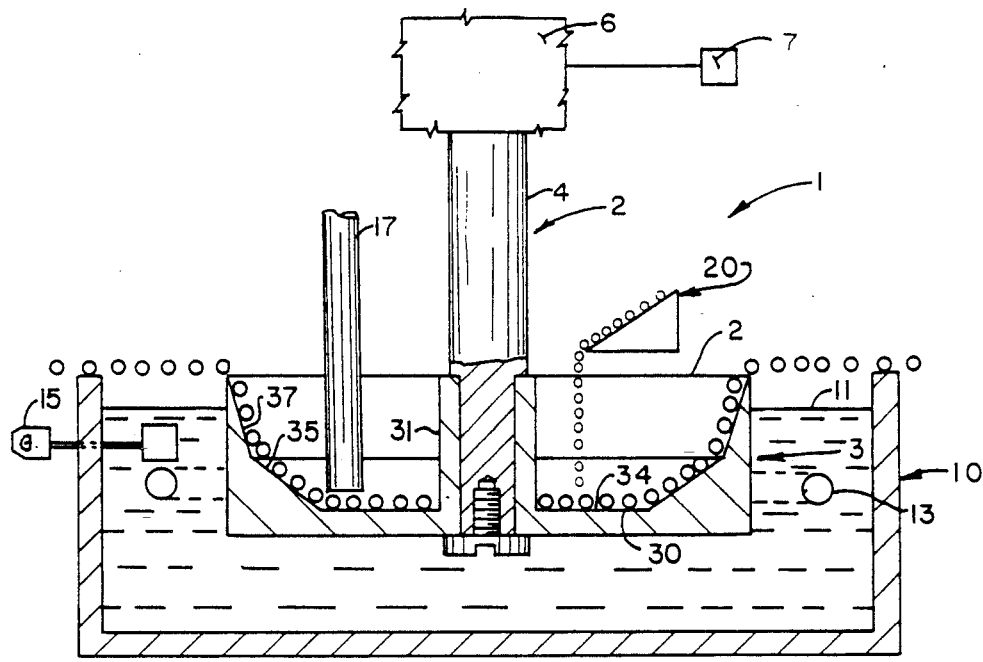
FIG. 1.
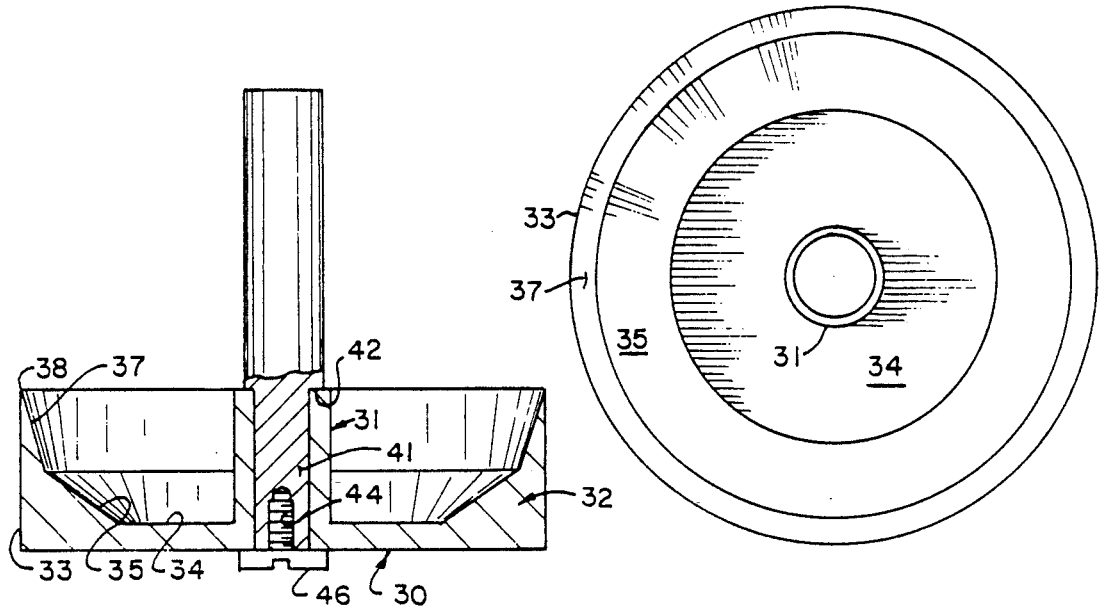
FIG. 2.
FIG. 3.

PARTICLE ENROBING PROCESS AND APPARATUS

BACKGROUND OF THE INVENTION

The art of coating particulate material is an old and crowded one. Spherical granules (beadlets), otherwise regularly shaped granules or irregularly shaped granules (all referred to as particles) of therapeutic materials are coated with coating material that is less soluble, or soluble under different conditions of pH, for example, than the enrobed particles, to produce a delayed or timed release of the medicament. Particles of disagreeable-tasting substances are coated to mask the taste. Other coatings are provided to protect the coated particles from the atmosphere or moisture. Rice has been coated with carboxy methylcellulose containing vitamins lost in the polishing process. Inert or therapeutically inactive carrier particles have been coated with silicone oil, for example to serve as an eructant. The coating has been accomplished in a number of ways, by spraying, mixing, tumbling, and, particularly in the case of the therapeutic materials coated for delayed release, by suspending the particles in a matrix of coating material, and spinning the mixture from a disc in the form of droplets or shearing the attenuated mixture at the periphery of the disc to form droplets which are then solidified by cooling, driving off of solvent, polymerization, or some combination of these processes.

A method and apparatus for coating granular salt material has been proposed, in U.S. Pat. No. 2,955,956, in which a liquid slurry of additive material is introduced centrally to a rotating plate, granular salt material is introduced to the surface of the plate radially outboard of the liquid slurry and inboard of the edge of the plate, and the coated salt is discharged from the periphery. However, that arrangement has the disadvantage of discharging excess slurry as well. In the case of a therapeutic material, this would mean that there were particles of active material and particles of inactive material which would have somehow to be sorted if known dosages were to be obtained.

A method and apparatus involving the centrifugal slinging of metal chips up the side of a conical bowl and over the upper edge have been proposed, in U.S. Pat. No. 4,298,476 but the object of that method and apparatus, is to separate the chips from lubricant, not to coat them, the lubricant being discharged through a porous part of the bowl and the separated chips being carried out by entrainment in a current of air.

In both of these patents, the plate or bowl has been rotated from beneath. It can be seen, however, that a plate or bowl can be driven by a motor mounted above them. In the embodiment of apparatus of the present inventions shown and described, the details of the motor drive and various feed mechanisms are not shown in detail because they are well within the skill of the ordinary mechanic and may be varied to meet the demands of volume of material to be treated, types of particulate material and nature of the coating materials, for example.

One of the objects of this invention is to provide a method and apparatus for coating granular material in such a way that the coated granular material is unmixed with droplets of coating material.

Another object is to provide such a method and apparatus that can be used in connection with various different kinds of granular materials and different coatings.

Yet another object is to provide such a method and apparatus that is simple, easy to use, and effective to produce a substantially uniform and reproducible resultant product.

Other objects of this invention will be apparent to those skilled in the art in light of the following description and accompanying drawings.

SUMMARY OF THE INVENTION

In accordance with this invention, generally stated, a method of enrobing material is provided in which a liquid coating material and particles of a greater density than the coating material are introduced to a spinning cup having an outwardly upwardly extending peripheral wall with an upper edge. Preferably, the coating material and granules are introduced at different stations. The speed of rotation of the spinning cup is controlled to cause the coating material to climb up the wall and to stop short of the upper edge, but to cause the particles to travel through the coating material, be enrobed with the coating liquid, climb out of the liquid coating material, and be ejected over the upper edge of the cup. The diameter of the cup, the slope of the side wall, and whether the side wall is of uniform slope or is stepped, depend to some extent upon the nature of the particles and of the coating material. For the most part, it is desirable that the particles traverse the coating material quickly, both for the sake of efficiency and to minimize any interaction between the coating material and the particles, although that may not inevitably be desirable.

BRIEF DESCRIPTION OF THE DRAWINGS

In the drawings, FIG. 1 is a somewhat diagrammatic representation of apparatus by which the method of the present invention is being accomplished;

FIG. 2 is a view, partly in section, of a spinner cup for use in carrying out the method of this invention; and FIG. 3 is a top plan view of the cup shown in FIG. 3.

DESCRIPTION OF THE PREFERRED EMBODIMENT

Referring now to the drawing, and particularly to FIG. 1, reference numeral 1 indicates one illustrative embodiment of apparatus, shown diagrammatically, for use in performing the method of this invention. The apparatus 1 includes a spinner assembly 2 which includes a spinner cup 3 mounted on the lower end of a shaft 4 which is driven by a motor 6 the speed of which is regulated with a controller 7.

The cup 3 is, in the embodiment shown, positioned within the confines of an open topped tub 10 containing a bath of liquid 11. Heating and cooling coils 13, submerged in the bath 11, are outboard of, hence clear of the cup 3. A temperature controller 15 with a sensor in the bath 11 is shown diagrammatically. The apparatus also includes a coating material delivery pipe 17 and a particle delivery chute 20. The entire apparatus, sometimes referred to hereinafter as the processor, includes a free-fall area for the newly coated particles, to which air is supplied at a desired temperature, and a collector or receiver, receiving the coated particles and from which the coated particles are removed, but these are conventional and are not illustrated.

In this illustrative embodiment, the cup 3 has a bottom wall 30 in the center of which, integral with the bottom wall 30, is a hollow cylindrical hub 31, with a passage axially through it. The cup has a side wall 32, an outer surface 33 of which is uniformly cylindrical. The inner surface of the cup 3 has a planar surface area 34, perpendicular to the axis of the hub 31 and extending from the hub to the lower edge of an upwardly outwardly inclined lower annular ramp surface 35, which ends at the base of an upper, upwardly outwardly sloping annular ramp section 37. The upper ramp section 37 ends at a sharp arris 38 with the outer surface 33 of the side wall 32.

The shaft 4 has a reduced diameter at its lower end, defining between a reduced end 41 and the part of the shaft above it an annular shoulder 42. A tapped blind hole 44, extending axially from the lower end of the shaft, receives a retaining cap screw 46, which, when tightened, captures the hub between the head of the cap screw and the shoulder 42. Any conventional expedient can be used to insure that the cup is fixedly mounted against rotation relative to the shaft 4 when the shaft is rotated, such, for example, as a spline or key or a non-circular configuration of the inner surface of the hub and outer surface of the reduced section 41, or even a slight downwardly convergent taper of the portion 41 to insure a tight friction fit, the means for securing the shaft and cup against relative rotation being no part of this invention.

In the illustrative example here described, the entire cup is made of stainless steel. Its surfaces, particularly the inside surfaces, are polished. The diameter to the outer edge is five inches. The diameter of the planar surface 34 is three inches. The diameter at the meeting line of the lower ramp surface 35 and the upper ramp surface 37 is four and a half inches. The pitch of the lower ramp surface 35 is one hundred and forty-five degrees from the planar surface 34, and the pitch of the upper ramp surface with respect to the planar surface 34 is one hundred degrees. The depth of the cup from the arris 38 to the surface 34 is one and a quarter inches, the vertical height from the surface 34 to the meeting line between the surfaces 35 and 37 is a half inch, and the height of the upper ramp surface, vertically, is three quarters of an inch. The overall height of the cup is one and a half inches. The shaft above the reduced section 41 is three quarters of an inch in diameter, and the reduced section, a half inch in diameter.

Molten coating is delivered into the cup about a quarter of an inch radially outward from the cup hub, and about a half inch from the bottom. The particle delivery chute delivers the particles in approximately the same relative position approximately a hundred-eighty degrees opposite the coating feed position.

The rate of rotation is approximately six thousand r.p.m., but that rate can be and will be varied to accommodate coatings of various specific gravities and viscosities, and particles of different densities.

The usual production rate from the cup described, is about one hundred fifty kilograms per hour. The coating will often constitute about ten percent of the finished coated particle composition. Accordingly, if the coating does in fact constitute ten percent of the total weight, the coating is fed at a rate of about fifteen kilos per hour, and the particles being coated, at about one hundred thirty-five kilos per hour.

The governing requirement for coating materials is that they must be free flowing liquids which become solid and form continuous films when subject to ambient conditions established within the processor. Liquefied solids having suitable properties to serve as useful coatings can be melts of pure materials or compatible mixtures of materials; aqueous solutions, usually highly concentrated and super-saturated at elevated temperatures; solvent solutions highly concentrated because of solubility and elevated temperature; amphoteric aqueous or solvent solutions; gelable mixtures, or polymerizable materials or mixtures. Other coatings will suggest themselves to those skilled in the art.

The specific gravity of coating materials is typically 0.75 to 1.3. Typical specific gravity of the particles to be coated is 0.85 to 3.0. The absolute specific gravities of the coating materials and particles is not important, as long as the specific gravity of the particles is greater than that of the material with which they are to be coated. The viscosity of the coating material is closely controlled, because it substantially effects the thickness of the coating, along with the shear, elasticity, cohesiveness and adhesiveness of the coating material. "Flowability" will vary from watery to syrupy. As measured with a Brookfield viscometer, it will range from about fifteen to eight hundred centipoises.

The range of particle diameters can be wide, for example, from two hundred to one thousand microns. The particle shape may vary from spherical to irregular particles. The irregular particles are generally of a shape in which no edge measurement is more than about 1.25 times the smallest edge length. The particles within a batch to be coated are preferably uniform within a hundred twenty-five percent from the smallest particles to the largest particles.

The depth of the liquefied coating layer along the planar surface of the cup should be no less than the maximum diameter of the particles to be coated, and preferably no more than four times their average diameter, and preferably not deeper than about one eighth of an inch.

For most applications, the coating materials are heated to produce the desired viscosity, being preheated before their introduction to the cup, and being heated in the cup by virtue of the heating, by the coils 13, of the bath 11. The temperature of the ambient air, into which the coated particles are flung, is also carefully controlled.

The temperatures at which most of the coating materials are liquefied suitably will range from about one hundred to two hundred sixty degree Fahrenheit. The range of temperature variation for a given material, should not exceed five percent. It is important that the temperature for a given material be controlled within narrow limits, because the temperature affects the flowability and also the required temperature differential in the ambient air temperature within the chamber in which the coatings are set. These temperatures and differentials will affect the thickness and uniformity of the coating on each particle and variations between particles.

The temperature of the cooling air is generally between about forty and eighty degrees Fahrenheit, plus or minus two degrees, to provide about a one hundred degree spread between the initial temperature of the coating and the temperature of the coated particle when it reaches the receiver. The relative humidity is generally no more than twenty to sixty percent, to avoid condensation on the chilled particles after the coating is solidified during their free fall. In the case of coatings containing a solvent, the relative humidity and the solvent content of the ambient air will be controlled to accommodate the particular solvent.

In the case of polymerizable coatings, it may be desirable to chill, rather than to heat the coating material, so as to inhibit polymerization until the coated particles have been thrown from the dish into heated air or an irradiation zone. In any of the cases, if a simple free fall is not sufficient, the coated particles can be suspended in an up draft of air, in a sort of fluidized bed, until the coatings have hardened.

The particles themselves can take the form of solidified droplets of substances that are normally liquid at room temperature, either frozen or solidified by low temperature, their passage through the coating material being rapid enough to insure that they do not liquefy in the process, to produce what at normal room temperatures will be an encapsulated liquid.

The coatings will generally be on the order of one to ten microns thick after one pass through the processor.

The following tables are merely illustrative of various particulate materials and coating compositions that may be used, but are by no means exhaustive. In the tables the amount of coating is expressed as a percentage weight gain.

TABLE 1

TYPICAL MICROENCAPSULATED PRODUCT COMPOSITIONS

| Number | Substance | % Coat | Coating Material |
|---|---|---|---|
| | Pharmaceuticals (Single Substances) | | |
| (1)(2) | Potassium Chloride | 10-20 | Mono & Diglyceride |
| (3) | Potassium Chloride | 10-20 | Carnauba Wax |
| (4) | Acetaminophen | 10-20 | Mono & Diglyceride |
| (5) | Ascorbic Acid | 10-20 | Mono & Diglyceride |
| (6) | Acetylsalicylic Acid | 10-20 | Carnauba + CAP* |
| | Pharmaceuticals (Matrix Particles) | | |
| (7) | Cimetidine | 5-15 | Carnauba Wax |
| (8) | Dextromethorphan HBr | 5-15 | Mono & Diglyceride |
| (9) | Erythromycin | 10-15 | M. & DG. & Carnauba Wax |
| (10) | Ferrous Fumerate | 5-10 | Mono & Diglyceride |
| (11) | Pseudoephedrine HB1 | 10-15 | M. & DG. & Carnauba Wax |
| | Food Products (Single Entities) | | |
| (12) | Ascorbic Acid | 10-20 | Carnauba Wax |
| (13) | Citric Acid | 5-10 | H.P.M.C.** |
| | Food Products (Matrix Particles) | | |
| (14) | Ferrous Fumerate | 10-15 | Mono & Diglyceride |
| (15) | Riboflavin | 5-10 | Carnauba Wax |
| (16) | Fish Liver Oil | 10-20 | Triglyceride & Car. Wax |
| (17) | Butter Flavor Oil | 5-10 | M., Di & Triglyceride |
| (18) | Vanilla S.D. | 15-20 | Carnauba Wax |
| (19) | Vitamin E Succinate | 10-15 | Carnauba Wax |
| | Industrial Chemicals | | |
| (20) | Dyes | 10-20 | Polyethylene Glycol |
| (21) | Insecticides | 10-20 | Microcrystalline Wax |
| (22) | Flame Retardants | 5-10 | Microcrystalline Wax |

*cellulose acetate phthalate;
**Hydroxy propyl methyl cellulose

TABLE 2

TYPICAL MICROENCAPSULATED PRODUCT COMPOSITIONS

| Number | Therapeutic Use | Reason For Coating |
|---|---|---|
| | Pharmaceuticals (Single Substances) | |
| (1) | Potassium Loss | Reduce interactivity |
| (2) | Hypokalemia | Taste masking |
| (3) | Potassium Loss | Prolonged action |
| (4) | Analgesic/Antipyretic | Taste masking |
| (5) | Vitamin C Deficiency | Taste mask; stabilize |
| (6) | Analgesic | Reduce irritation |
| | Pharmaceuticals (Matrix Particles) | |
| (7) | Anti-Ulcer | Taste masking |
| (8) | Antitussive | Taste masking |
| (9) | Antibacterial | Taste masking |
| (10) | Hematinic | Taste masking |
| (11) | Bronchodilator | Prolong action |
| | Food Products (Single Entities) | |
| (12) | Antioxidant | Reduce interactivity |
| (13) | pH Regulatant | Control solubility |
| | Food Products (Matrix Particles) | |
| (14) | Supplement | Taste Masking |
| (15) | Supplement | Stabilization |
| (16) | Supplement | Convert Oil to Powder |
| (17) | Flavoring | Convert Oil to Powder |
| (18) | Flavoring | Stabilization |
| (19) | Animal Nutrition | Oil to Powder & Stab. |
| | Industrial Chemicals | |
| (20) | Colorants | Easier handling |
| (21) | Insert Control | Prolong action |
| (22) | Fire Control | Stabilization |

In carrying out the method of this invention, coating material is permitted to flow into the cup until its desired depth is obtained, the rate of rotation of the cup being adjusted to the place at which the coating material is moved by centrifugal force up the ramp surface 35, but short of the arris 38. The particles to be coated are introduced through the chute 20, the particles moving through the coating material, beyond the upper edge of the coating material and out over the arris 38, over the side wall of the tub and into a space through which they can fall while the coating is hardened. The temperature of the bath is maintained constant, as has been explained heretofore. As has also been explained, the coating material and the particles are fed continuously to the cup. All of the other factors remaining constant, the rate of rotation of the cup, once it has been established at a point at which the coating material remains in the cup and the coated particles are expelled from it, can also be kept constant.

By way of specific example of enrobing particles by the method of this invention, particulate potassium chloride in the form of cubic shaped particles with some rounded edges, in particle sizes in the range of 850-250 microns (20-60 mesh), with a specific gravity of 1.987 is coated with vegetable oil (mono and diglycerides), in this example, a product sold under the trademark ATMOS 150 K, a product of Humko Chemical Division of Witco Corp., with a specific gravity of 0.984 and a viscosity at 170° F. of 20-40 CPS. The coating material and particles are introduced to the cup described above in the manner described above while the cup is rotating at 6000 rpm. The temperature of the coating material and cup is 170° F. (76.7° C.) ±5°, the temperature of the ambient air, 68° F. (20° C.). The dwell time in the air after leaving the rim of the cup is 2-5 seconds.

Numerous variations in the apparatus and method of this invention, within the scope of the appended claims, will occur to those skilled in the art in light of the foregoing disclosure. Merely by way of example, the inner surfaces of the side wall of the cup can be made in a continuous curve, rather than being distinctly stepped. The dimensions of the cup can be varied. The cup can be driven by a shaft projecting downwardly from the bottom wall, through a gland, with the driving motor beneath the tub. The configuration of the outside of the cup can also vary, as for example, by making the side wall through the reach of the first ramp section 35 uniformly thick. Additional steps in the inside surface can also be provided, if it is found desirable, so long as the object of retaining the coating material within the cup and expelling the coated particles beyond the upper reach of the coating liquid is attained. Although it is not the preferred method, the particles and coating material can be introduced concurrently from the same dispensing device into the cup. Such a system makes control of the amount of coating material more difficult. Different methods of heating the cup, other than liquid in a bath, can be employed, such, for example, as an electric heating element mounted on the outer surface of the bottom of the cup or mounted adjacent the cup, or an infra-red radiator, or preheated air, or steam, so long as the temperature is carefully controlled. These are merely illustrative.

Having thus described the invention, what is claimed and desired to be secured by Letters Patent is:

1. A process of coating particles comprising introducing, to a spinning cup having an outwardly upwardly extending inner surface with an upper edge, a liquid coating material and particles of greater density than said coating material, said coating material and particles being introduced inboard of said inner surface, controlling the speed of rotation of said spinning cup to cause said coating material to climb up said inner surface and to stop short of said upper edge, but to cause said particles to travel through said coating material, be enrobed with said coating material, climb out of said liquid coating material, and be ejected over said upper edge.

2. The process of claim 1 wherein said liquid coating material is introduced to said cup in a stream separate from said particles.

3. The process of claim 1 including the step of heating said coating material before the coating is accomplished, and thereafter cooling the coated particles.

4. The process of claim 1 wherein said inner surface is stepped progressively outwardly upwardly.

5. The process of claim 3 including heating the cup itself to a temperature sufficient to maintain the coating material at the desired temperature.

6. The process of claim 4 wherein said inner surface of said cup has a central planar surface, a lower ramp surface extending at approximately 145 degrees from the planar surface and an upper ramp surface extending upwardly from the upper edge of the lower ramp surface to the upper edge of the cup at an angle of approximately 100 degrees with respect to said planar surface.

7. The process of claim 2 wherein the coating material is introduced in the amount of approximately 5 to 20 percent of the particles to be coated, but sufficient to produce a depth of coating material over the said planar surface greater than the height of any of said particles.

8. Apparatus for coating particles comprising a cup symmetrical about a central vertical axis, said cup having an inner surface sloping outwardly upwardly, said surface having an upper edge, means for spinning said cup about said central axis, means for feeding to said cup radially inboard of said surface a liquid coating material and particles of a density greater than the density of said liquid coating material, and means for controlling the speed of rotation of said spinning cup to cause said liquid coating material to climb said inner surface but to stop short of said upper edge, and to cause said particles to travel through said coating material, to be enrobed with said coating material, to climb said surface above the level of the coating material, and to be ejected over said upper edge.

9. The apparatus of claim 8 wherein the cup has a central planar surface between said central axis and said sloping inner surface.

10. The apparatus of claim 8 wherein the surface is stepped outwardly upwardly.

11. The apparatus of claim 8 wherein said inner surface of said cup has a central planar surface, a lower ramp surface extending at approximately 145 degrees from the planar surface and an upper ramp surface extending upwardly from the upper edge of the lower ramp surface to the upper edge of the cup at an angle of approximately 100 degrees with respect to said planar surface.

12. The apparatus of claim 11 wherein the cup is about five inches in diameter at its upper edge, the vertical height of the lower ramp section from the planar surface is about one-half inch, and the vertical height of the upper ramp surface is about three fourths of an inch.

13. The apparatus of claim 12 including a coating material feed tube and a particle feed chute, positioned to deliver, respectively, coating material and particles to said planar surface of said inner surface of the cup on diametrically opposite sides of the said central axis of said cup.

14. The apparatus of claim 13 wherein the coating material feed tube is positioned to deliver coating material about five eighths of an inch from said central axis and about one half inch above said planar surface.

* * * * *